United States Patent [19]

Carlson

[11] 3,817,002

[45] June 18, 1974

[54] AUTOMATIC INDEXING HEAD FOR MACHINING A WORK PIECE

[76] Inventor: Stanley H. Carlson, 7 Stephen St., Derby, Conn. 06418

[22] Filed: June 1, 1972

[21] Appl. No.: 258,531

[52] U.S. Cl............... 51/216 ND, 51/287, 51/288
[51] Int. Cl........................................... B24b 3/34
[58] Field of Search..... 51/216 ND, 287, 288, 165.9

[56] References Cited
UNITED STATES PATENTS

| | | | |
|---|---|---|---|
| 1,862,840 | 6/1932 | Bullock.................. | 51/216 ND UX |
| 2,296,731 | 9/1942 | Mustonen................ | 51/216 ND X |
| 2,396,495 | 3/1946 | Drake..................... | 51/216 ND |
| 2,600,960 | 6/1952 | Benjamin............... | 51/216 ND UX |
| 2,804,722 | 9/1957 | Carlsen................... | 51/216 ND X |
| 3,136,093 | 6/1964 | Deprez.................... | 51/216 ND X |

*Primary Examiner*—Donald G. Kelly
*Attorney, Agent, or Firm*—Arthur T. Fattibene

[57] ABSTRACT

This disclosure is directed to an automatic indexing head for machining a work piece. The indexing head comprises a base support for mounting the head to the table of a machine to support a work piece relative to a cutting tool at a given angle. Mounted on the base is a work holder which is operatively associated with a unidirectional drive for slightly over indexing the work piece a predetermined amount; and a locator is disposed opposite the work piece which when operated is arranged to mesh with the work piece to accurately effect the indexing thereof to the cutting tool adapted to operate on the work piece.

15 Claims, 6 Drawing Figures

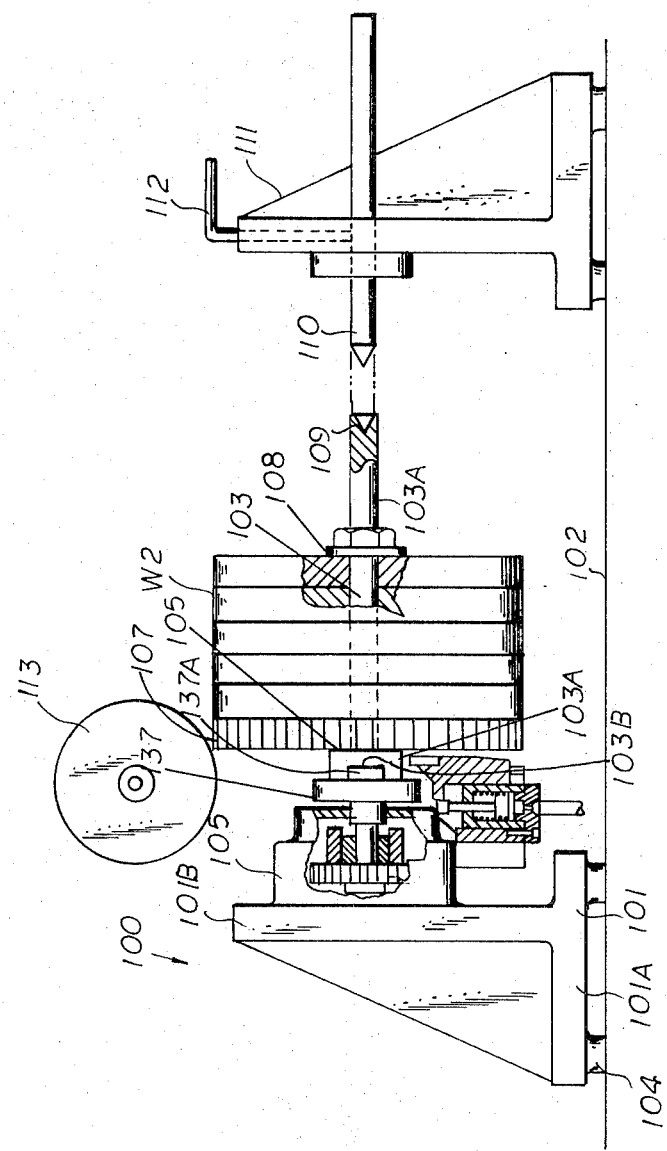

AUTOMATIC INDEXING HEAD FOR MACHINING A WORK PIECE

PROBLEM AND PRIOR ART

Heretofore the task of cutting or machining a work piece, e.g., cutting a gear or resharpening a gear cutter, was generally performed by a manual operation which was a tedious and time consuming operation, often taking as long as 6 to 8 hours to cut or resharpen a gear cutter. The problem of resharpening gear cutters was chiefly attributed to the terrific hardness of the carbide material from which such cutters are formed. Normally in resharpening such gear cutters only about a half a thousandth (0.0005) to one thousandth (0.001) of an inch can be removed in any one pass of the cutting tool relative to the work piece or cutting gear. To resharpen a gear cutter it may be necessary to remove as much as six to possibly 10 thousandths of an inch of stock. This means that in 10 passes on a gear cutter, having for example 66 teeth, 660 passes are required, and an index between each tooth.

Also in the manual sharpening of gear cutters, it frequently happened that an unskilled operator could conceivably effect the removal of more of the stock than is desired. This generally resulted in a "burning" of the gear cutter causing a crystalization of the workpiece to occur which greatly reduced the life of the cutter. Also an operator attempting to remove too much of the material in a single pass greatly reduced the life of the diamond wheel that is used on the grinding or cutting tool.

To effect the indexing of the gear cutter manually, an indexing plate was heretofore utilized which had to be manually set up. However, if there were any error in locating the index plate relative to the tooth of the cutter, there would result a "pick-up" in the error as each tooth is being sharpened.

Another time consuming aspect of manual sharpening of gear cutters was the set up time required to dispose the cutter at a compound angle relative to the cutting tool in order to provide the proper clearnce and cutting rake. Under present known methods the entire fixture would have to be removed from the bed of a cutting machine, and affixed thereto the proper plate to compensate for any change of angle. Frequently it would also be necessary to change the index plate to correspond with the number of teeth of the cutter to be ground. As a result such changeover heretofore required a lapsed time of some 2 to 4 hours. The known system also required a compound angle plate and index plate to be made available for every different size or number of geared teeth that were required to be cut or sharpened, which in many instances required a large expenditure in stocking the requisite number of tools needed for such changeovers.

OBJECTS

An object of this invention is to provide an indexing head constructed to automatically index a gear or gear cutter during a sharpening operation which is accurate and simple to operate.

Another object is to provide an indexing head in which the work piece can be properly and accurately indexed without any "pick-up" in error as each tooth is sharpened.

Another object is to provide an indexing head mounted on a base which permits the work piece supported thereon to be readily positioned at any desired compound angle relative to the cutting tool.

Another object is to provide an indexing head in which the work piece is properly positioned and maintained in the proper indexing position.

Another object is to provide an automatically operated indexing head which can be quickly and easily set up at the requisite compound angle.

Another object is to provide an automatic indexing head which is relatively simple in construction and inexpensive to manufacture.

Another object is to provide an automatic indexing head that can be readily utilized for either vertical or horizontal cutting, shaping or sharpening internal and external spur gears, bevel gears, milling cutters, and/or the resharpening of hardened cutters.

BRIEF SUMMARY OF THE INVENTION

The foregoing objects and other features and advantages of this invention are attained by an automatic indexing head and a base therefor. The base, in one form of the invention, comprises a base plate adapted to be secured to the bed of a grinding or cutting machine. A first and second sine plate are superimposed on the base plate and operatively hinged to rotate about axis of rotation disposed at right angles to each other so that by relative displacement of the respective sine plates, a desired compound angle can be set. Camming means operatively associated with the respect sine plates are provided to effect individual adjustment thereof to a pre-set position.

Connected to the uppermost sine plate is the housing on which a work holder, e.g., a worktable and connected spindle, is rotatably mounted. The arrangement is such that the work piece is secured to the table to rotate therewith. Operatively connected to the table and spindle is a unidirectional drive for effecting the indexing of the table and the work piece secured thereto in a given direction.

The drive includes a driving gear mounted about the table spindle for relative rotation thereof. Connected to the driving gear is a clutch ring which is operatively associated with a clutch ratchet fixed to the spindle. A coupling means is interposed between the clutch ring and clutch ratchet to effect the drive of said table in one direction only when the driving gear is operated in the direction of index only.

The actuating means for the driving gear comprise a fluid activated rack disposed in meshing relationship therewith; and an adjusting means is operatively arranged to limit the linear displacement of the rack and thereby the angular rotation of the table.

A locator is disposed opposite the work piece which is fluid actuated between operative and inoperative position. The locator includes a gear sector having a tooth arrangement adapted to mesh with the teeth of the work piece to position and maintain it in the indexed position.

The unidirectional drive and locator are operatively connected in a suitable control circuit so as to be sequentially actuated so that the indexing and cutting operation may be automatically performed.

In another form of the invention the base comprises a base having a vertically disposed flange against which the index housing is vertically disposed for supporting the work piece about a horizontally disposed work holder, e.g., an arbor on which one or more work pieces can be supported.

FEATURES

A feature of this invention resides in the provision of an indexing head and base therefor which permits the head to place at compound angles relative to a cutting tool in a simple and expedient manner.

Another feature of this invention resides in the provision of an indexing head having a unidirectional drive which can be readily adjusted to vary the degree of indexing so as to render it adapted for resharpening various sizes of gears or gear cutters.

Another feature of this invention resides in the provision of a locator means for accurately positioning and maintaining the work piece in the indexing position.

Another feature of the invention resides in the provision wherein the indexing head can be readily disposed to a cutting or grinding tool to facilitate the gang cutting, shaping or forming of a work piece. Other features and advantages will become more readily apparent when considered in view of the drawings and description in which:

FIG. 6 is a side elevation view of a modified form of the invention.

Figure 1:
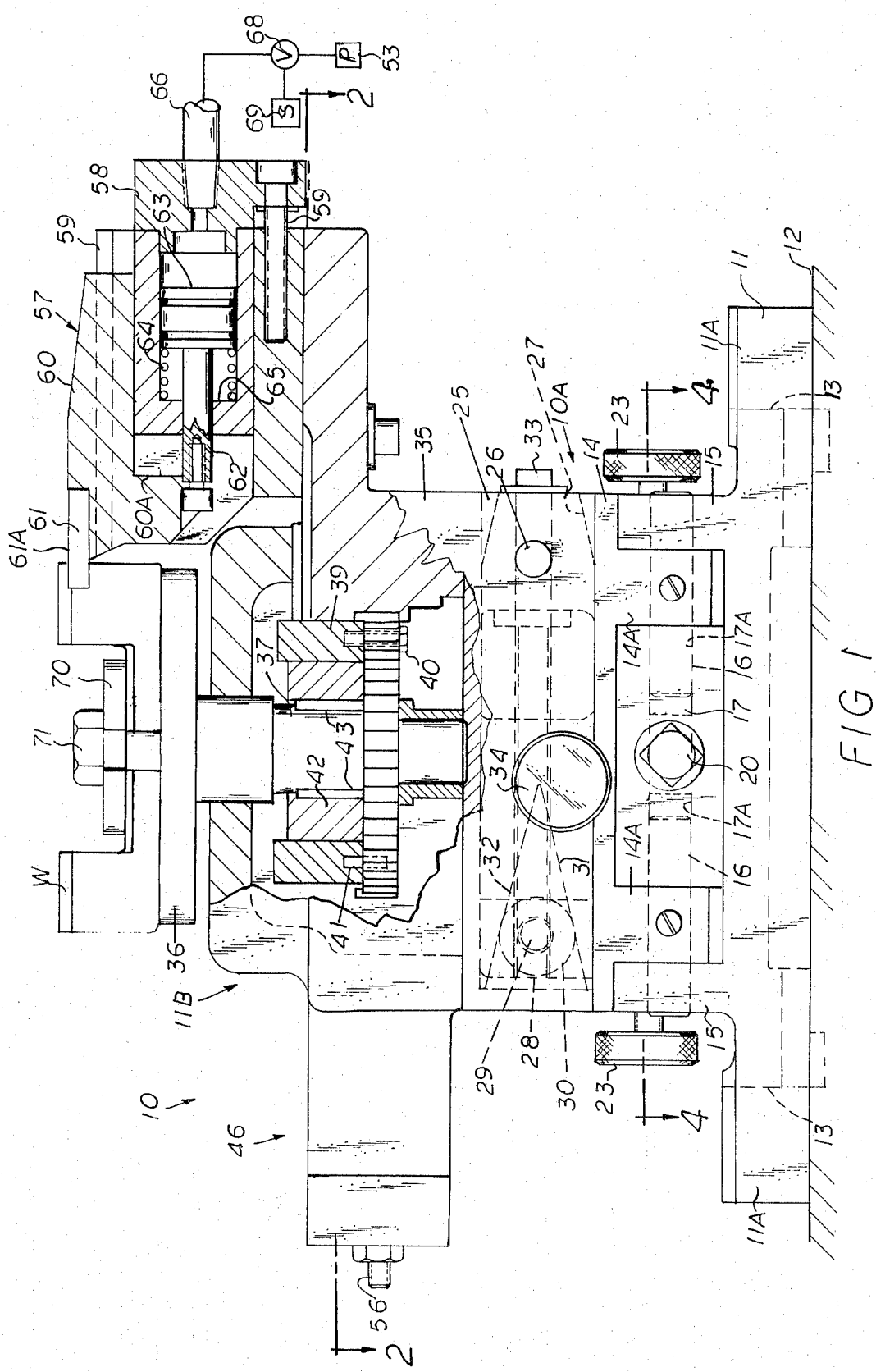
FIG. 1 is a side elevation view of an indexing head embodying the present invention having parts thereof shown in section.

Referring to the drawings there is shown in FIGS. 1 through 5 the indexing head and base assembly 10. The base portion 10A of the indexing head assembly 10 comprises a base or bottom plate 11 which is adapted to be secured to a table portion 12 of a grinding machine. The base plate 11 is provided with a pair of opposed lateral flanges 11A having a slotted notch 13 formed therein by which it may be suitably secured to a table 12 of a grinding, cutting or drilling machine by suitable fasteners. Pivotally connected to the bottom or base plate 11 is a first sine plate 14 which is adapted to pivot about an axis of rotation extending along an edge portion of the base plate 11. As best seen in FIG. 1 the base plate 11 is provided with a pair of spaced apart upright flanges 15—15 forming a bearing for the hinge pins 16—16 about which the sine plate 14 is rotated. Sine plate 14 is provided with opposed depending flanges 14A—14A adapted to be received within the upright flanges 15—15 of the base plate 11, and the depending flanges 14A are provided with a suitable opening through which the hinge pins 16—16 extend. Between the depending flanges 14A—14A of the sine plate 14 adjacent the edge about which the sine plate pivots is a bearing block 17 which is provided with opposed recesses 17A to define a bearing support for the inner end of the hinge pins 16—16. The arrangement is such that the sine plate 14 can pivot about the opposed hinge pins 16—16 about an axis of rotation disposed along one edge of the base member 11.

Figure 4:
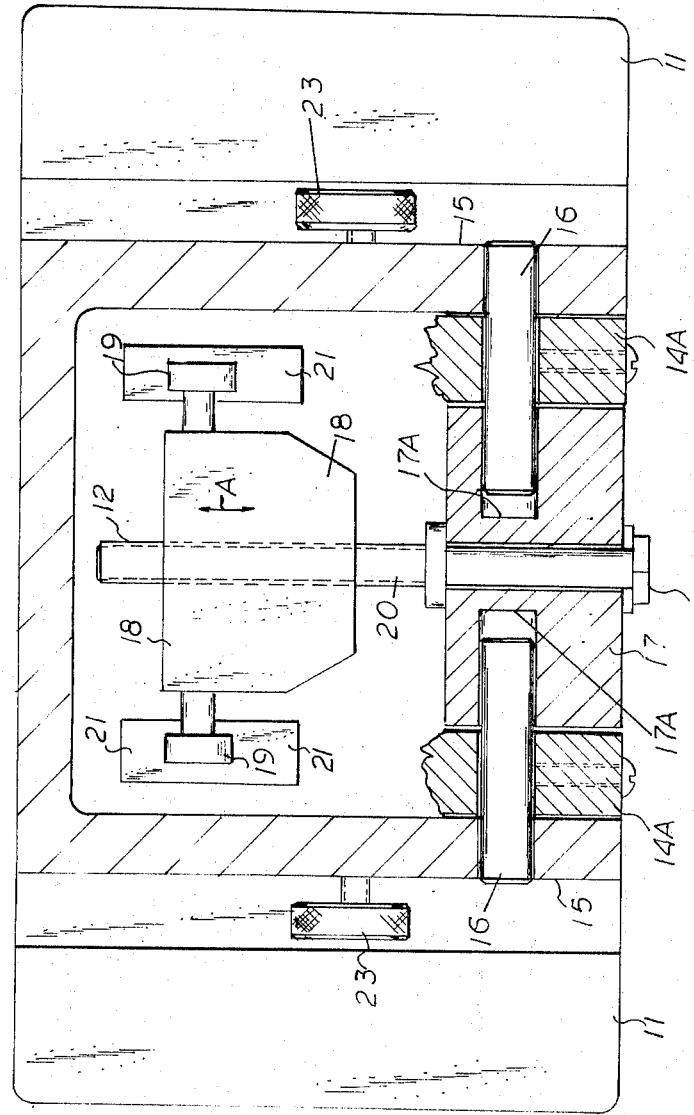
FIG. 4 is a planned sectional view taken through line 4—4 on FIG. 1.
Figure 5:
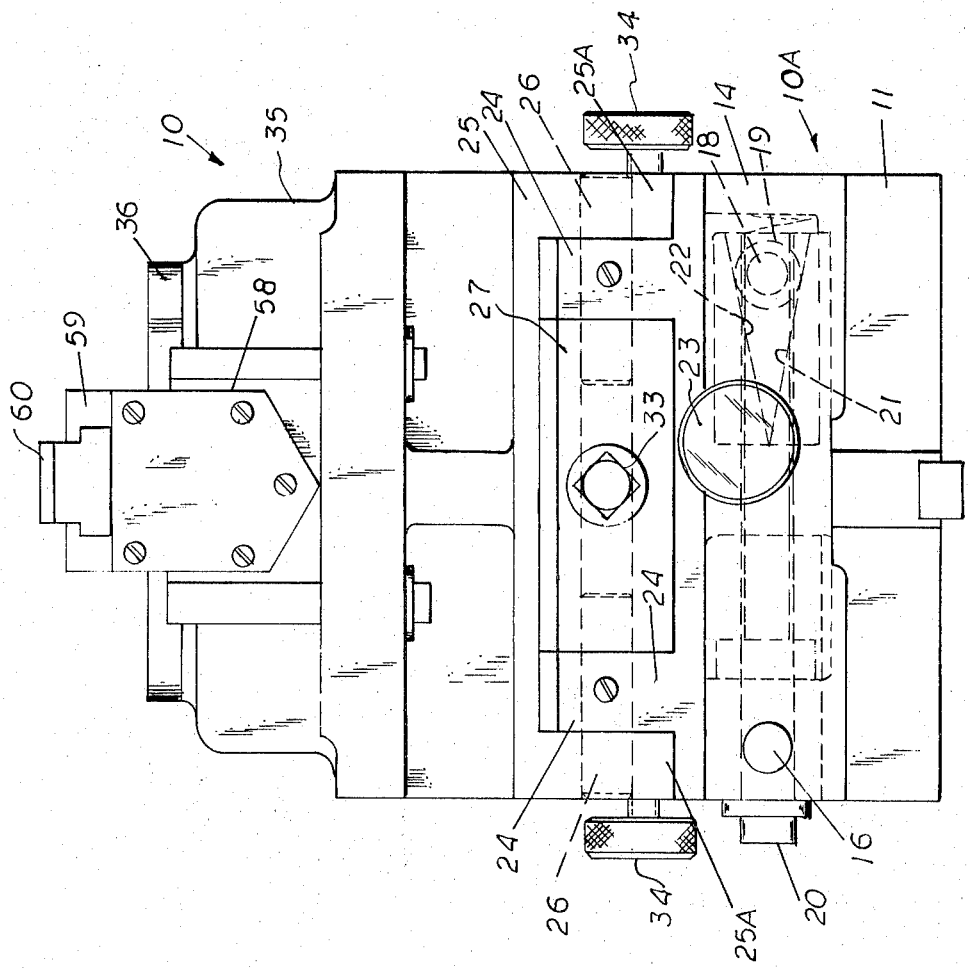
FIG. 5 is a side elevation view of the indexing head.

Disposed between the base member 11 and the first sine plate 14 is a camming means in the form of a cam carrier 18 which is arranged for movement transversely of the base member 11 as indicated by arrow A on FIG. 4. Cam rollers 19 are rotably journalled to opposed side portions of the cam carrier 18. An adjusting screw 20 extending through the bearing block 17 connects to the cam carrier 18 to effect the adjustment of the cam carrier 18 transversely along the base member 11. Connected to the base member 11 and depending from the first sine plate 14 are complementary inclined planes 21, 22 arranged to be disposed in rolling engagement with the cam rollers 19 of the cam carrier 18. The arrangement is such that depending upon the direction of rotation of the adjusting screw 20, the cam carrier is moved transversely of the base member in one direction or the other, and in doing so will cause the cam followers to effect displacement of the first sine plate relative to the base member about pivots 16—16 as the rollers 19 ride between the inclined planes 21, 22. By control of the adjustment screw sine plate 14 may be rotated relative to the base member to determine a predetermined angular relationship therebetween.

Oppositely disposed torque lock screws 23 are provided for securing the sine plate 14 in the appropriate adjusted position relative to the base member.

Connected to the upper portion of the first sine plate 14 along an edge disposed 90° with respect to the pivoting edge of the sine plate 14 are opposed uprights or flanges 24—24 to form pin bearings about which a second or upper sine plate 25 is pivotally connected. The upper or second sine plate 25 is provided with a pair of opposed depending flanges 25A straddling flanges 24 with aligned openings therein for receiving pivot pins 26—26. Disposed between the flanges 24 is the bearing block 27 similar to the bearing block 17 of the lower sine plate 14 to define the bearing means for the inner ends of pivot pins 26—26.

A camming means is also interposed between the first sine plate 14 and the second mentioned sine plate 25 to provide a means whereby the second sine plate 25 may be pivoted relative to the first sine plate 14 to define a predetermined angular relationship therebetween. The arrangement is such that the axis of rotation of the first sine plate 14 relative to its base member 11 and the axis of rotation of the second sine plate 25 relative to the first sine plate 14 are disposed in a 90°, out of phase, relationship.

The camming means for effecting the relative adjustment of the second sine plate 25 relative to sine plate 14, comprises a cam carrier 29 having connected thereto cam rollers 30 similar to the cam carrier of the lower sine plate. Rollers 30 of carrier 29 roll between complementary incline cam surfaces 31, 32 similarly formed between the first and second sine plates.

A second adjusting screw 33 extends through the bearing block 27 of the upper sine plate 25 to connect to the cam carrier 28 so that rotation of the adjusting screw 33 in one direction or another effects a corresponding transverse movement of the cam carrier 29 transversely relative to the first sine plate.

A second pair of torque lock screws 34 are provided to secure the second sine plate 25 in adjusted angular relationship with respect to the first sine plate 14.

The base means 11A described thus provides an arrangement whereby the indexing head portion 11B, secured to the upper sine plate 25 can be set to a desired compound angle relative to a cutting tool or sharpening tool (not shown). Thus in operation it will be noted by turning the adjusting screw 20 for the first sine plate 14 in one direction or another that the angle between the first sine plate and the base member can be predetermined. Thereafter by effecting the adjustment of the second cam adjusting screw 33, the angular relationship between the second sine plate and the first sine plate can be set to determine the ultimate desirable compound angle.

Mounted on the upper sine plate 25 is the housing 35 for containing the moving components of the indexing head. A work holder, e.g. as shown in FIG. 1, turntable or work supporting table 36 having a depending connected spindle 37 is rotatably journalled within the housing by suitable bearings. A driving gear 38 is rotatably mounted within the housing so as to rotate relative to the table spindle 37. Secured to the upper surface of the driving gear 38 is a clutch ring 39. Preferably the clutch ring 39 is secured to the driving gear 38 by means of a plurality of circumferentially spaced fasteners 40, such as studs or the like. To insure proper orientation between the clutch ring 39 and the driving gear 38, one or more circumferential dowels 41 may be used to locate the clutch ring 39 to the gear and to prevent relative movement therebetween in the event that the studs 40 become loose.

Disposed within the clutch ring 39 and fixedly secured to the table spindle 37 by a suitable key arrangement 43 is a clutch ratchet 42. The clutch ratchet keyed to the spindle shaft is thus arranged to rotate in unison with the spindle 39.

Figure 2:
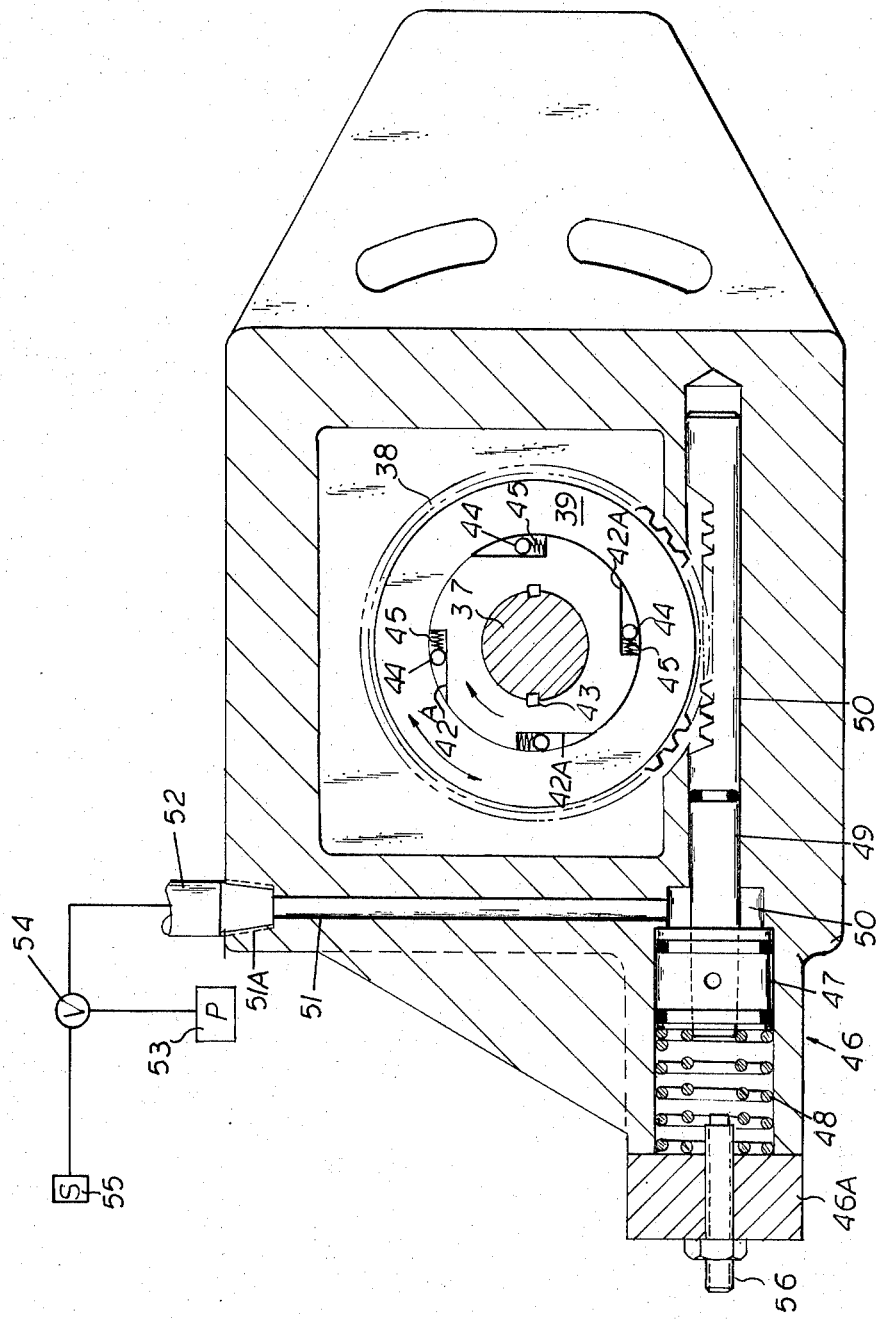
FIG. 2 is a plan section view taken along line 2—2 on FIG. 1.

As best seen in FIG. 2 the clutch ratchet 42 is provided with circumferentially spaced cut-out portion 42A which is adapted to receive a coupling means in the form of a clutch pin 44. Springs 45 are provided to exert a spring bias on the clutch pins 44.

As best seen in FIG. 2, the arrangement is such that the clutch ring 39 secured to the driving gear 38 locks the clutch ratchet 42 and connected spindle 37 in driving engagement therewith when the driving gear is rotated in a clockwise direction. The driving connection between the clutch ring 39 and clutch ratchet 42 is achieved as a result of the wedging action of the coupling pin between the circumferential portion of the clutch ring and the complementary straight edge of the ratchet notch 42A which results in a unidirectional drive. When the driving gear 38 is rotated in the opposite direction, or in the counterclockwise direction, as viewed in FIG. 2, the wedging relationship of the pins 44 between the clutch ratchet 42 and the clutch ring 39 is released thereby permitting the driving gear to be returned to its normal inoperative position without effecting the rotation of the clutch ratchet and connected table spindle. The drive thus described is unidirectional and permits the work table to be rotated an incremental amount only when the driving gear 38 is rotated in a clockwise direction.

To provide for automatic indexing of the work table and the workpiece secured to the worktable, an activating means in the form of a piston and cylinder assembly 46 is provided. As best seen in FIG. 2, a cylinder is integrally formed with the housing 35 of the indexing head adjacent one end thereof. Movably mounted within the cylinder 46 is a piston 47. In the illustrated form of the invention, the piston 47 is normally biased to an inoperative position by spring means 48 interposed between the cylinder end wall 46A and the piston head 47. Connected to the piston head 47 is a piston rod 49 which extends outwardly therefrom. The extended end of the piston rod is provided with a rack sector 50 which is disposed in meshing engagement with the driving gear 38.

Disposed in communication with the cylinder chamber portion 50 on one side of the piston head 47 is an inlet passageway 51 through which an actuating fluid is introduced into the cylinder portion 50. It will be understood that the actuating fluid may comprise compressed air which is introduced into the inlet 51A of passageway 51.

Operatively connected to the fluid line 52 between a source of fluid pressure, e.g. an air compressor 53 for directing the activating fluid into the inlet 51A is a solenoid valve 54 which may be suitably connected in circuit with a micro switch 55 disposed so as to be actuated by the movement of the table of the machine supporting the indexing head during a gear cutter resharpening operation. The arrangement is such that the table of the machine will effect actuation of the micro switch 55 to effect actuation of the solenoid valve for controlling the flow of fluid into the cylinder. Whenever the solenoid valve 54 is actuated to permit activating fluid to flow into the cylinder portion 50, the piston 47 will be displaced to the left as viewed in FIG. 2 causing the rack 50 to be linear displaced in the same direction and thereby effecting predetermined clockwise rotation of the driving gear 38. In doing so the clutch assembly is activated to effect the indexing of the work table and work piece thereon a corresponding amount. Upon release of the fluid pressure acting upon the piston 47, the tension of springs 48 acting on the piston will effect automatic return of the piston 47 and associated rack 50 to its normal inoperative position. In doing so the clutch drive is released causing the driving gear to rotate only in a counterclockwise direction.

In order to control the angular rotation of the worktable or the degree of incremental indexing of the workpiece W, the means is provided to effect the adjustment of the index.

As best seen in FIG. 2 the adjusting means comprises of an adjusting screw 56 threaded to the end wall 46A of the cylinder 46 wherein the inner end of the adjusting screw 56 defines a stop to limit the piston displacement, and thereby control the extent of the linear movement of the rack 50. As noted, controlling the linear displacement of rack 50 controls the angular rotation of the driving gear and worktable coupled through the clutch assembly thereto accordingly.

Figure 3:
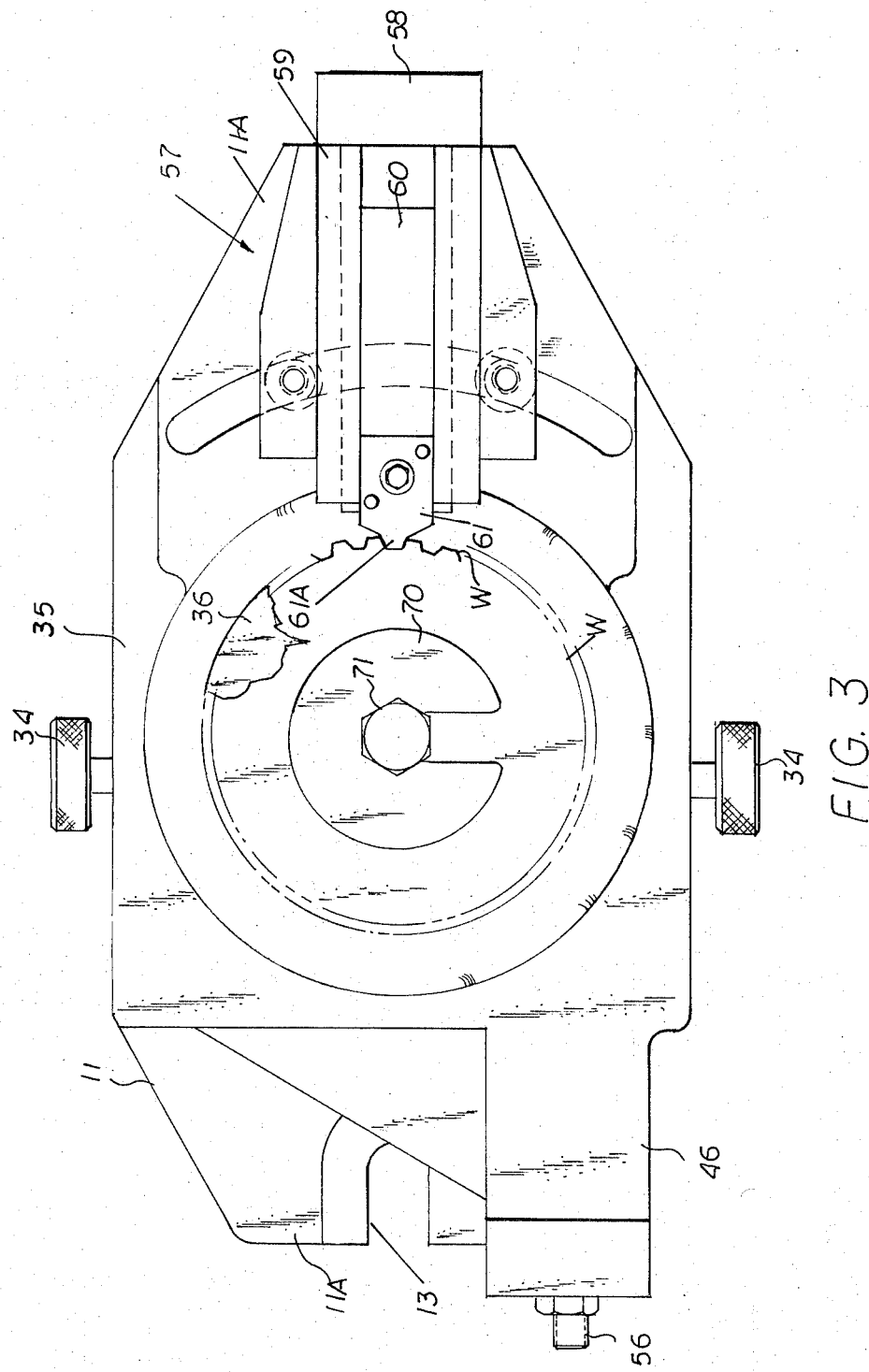
FIG. 3 is a top plan view of the indexing head of FIG. 1.

Preferably the adjusting screw 56 is set so that a displacement of the rack is had which will effect an amount of index slightly greater than that desired for a particular cutting or sharpening operation. Therefore to properly position and compensate for this slight over-index during a cutting or resharpening operation, a locator means 57 is disposed opposite the workpiece W, which when actuated will properly position and maintain the workpiece W in proper indexing position. As best seen in FIGS. 1 and 3 the locating means 57 comprises an assembly which is secured on the index housing 35 adjacent the workpiece W. As best shown the locator assembly 57 comprises a piston and cylinder assembly 58 which is suitably secured to the housing by a bolt fastener 59. Connected to the cylinder housing of the piston and cylinder assembly 58 is a slideway 59 in which there is reciprocally mounted a slide 60. Connected to the leading end of the slide 60 is a locator 61 which is formed with one or more teeth arranged to mesh or compliment with the teeth of the workpiece W. Depending from the slide 60 is a connecting lug 60A by which the slide 60 is connected to the piston rod 62 of the piston 63 disposed in cylinder 58. A spring 64 disposed between and end wall 65 of cylinder and the piston 63 normally biases the piston toward inoperative position. The arrangement is such that the introduction of an actuating fluid into cylinder 54 through line 66 will cause a displacement of the piston against spring 64 which results in a movement of the slide 60 and connected locator 61 toward the workpiece to effect an intermeshing of the locator teeth 61A with the teeth of workpiece W, and thereby locates and maintains the workpiece in the proper index during a cutting or reshaping operation. Upon release of the fluid pressure on the piston 63, the piston is displaced to the right, as viewed in FIG. 1, by means of spring 64.

The arrangement is such that the locator 61 is retracted to an inoperative position after each cutting operation, so that the workpiece W can be indexed to the next tooth whereupon the locator is rendered successively operative to accurately position the workpiece in the indexed position. To effect this sequential operation of the locator means 57, the actuating fluid introduced into the locator cylinder 58 is controlled by means of a solenoid valve 68 disposed in the fluid supply line 66. The solenoid valve 68 is connected in circuit with a switch means 69 located adjacent the bed of the machine to be operated by the moving table during a cutting operation.

With the structure described, the operation of the indexing head is as follows:

The indexing assembly 10 is suitably fixed to the table portion 12 of a cutting or grinding machine. The gear cutter or workpiece W to be sharpened is then securely clamped to the work or index table 36 by a suitable clamping plate 70 and lock nut 71. The respective sine plates 14 and 25 are then adjusted to determine the proper angle to provide for the proper clearance and/or rake. With the appropriate angles set by adjustment of the cam adjusting screws 20 and 33, the respective sine plates are locked in their respective adjusted positions by the torque lock screws 23 and 34.

During the operation of the machine the respective switches 55 and 69 are sequentially operated to effect automatic indexing of the workpiece after each cutting pass. To effect the indexing of the workpiece switch 55 is actuated to permit the associated solenoid valve 54 to permit fluid pressure into clyinder 50. The force of the fluid entering cylinder portions 50 causes the piston 40 to be displaced to the left as shown in FIG. 2 until it abuts the adjustable stop 56. Displacement of the piston effects linear displacement of rack 50 meshing with drive gear 38. Rotation of the driving gear 38 clockwise, i.e. in the direction of index, causes the clutch ring 39 to lock in driving relationship with the clutch ratchet 42 and associated spindle to advance the workpiece an indexing increment.

Upon the indexing of the workpiece to present the next succeeding tooth of the workpiece to the grinding wheel, the microswitch controlling the locator means 57 is actuated. Actuation of the switch 69 permits the valve 68 controlled thereby to direct a fluid pressure into cylinder 58 to advance the piston 63 therein. The locator slide upon displacement of the piston 63 moves the locator teeth 61A into meshing relationship with the teeth of the workpiece W. With the locator 61 protracted into holding position the fluid pressure acting on the indexing piston 47 is released, whereupon the spring 48 return the indexing piston 47 and associated rack 50 to its normal inoperative position. In doing so the driving gear is rotated in a counterclockwise direction, as viewed in FIG. 2 whereby the coupling between the clutch ring and clutch ratchet is released and whereby the rack 50 is readied to effect the next indexing step. The arrangement is such that upon the return of the rack 50 and driving gear 38 to their respective inoperative positions, the work piece is prohibited from rotating by the operation of the locator 61 whereby the teeth 61A of the locator mesh with the teeth of the work piece to hold the work piece in the indexed position.

With the locator means 61 maintaining the work piece in the proper indexing relationship relative to the cutting tool (not shown) the work piece is moved through a cutting pass. Upon completion of the cutting pass, switch 69 is activated to effect the retraction of the locator means 57 whereby the indexing cycle described is repeated to advance the work piece to present the next succeeding tooth to be shaped or sharpened.

From the foregoing it will be readily apparent that positive and accurage indexing of a work piece is provided whereby the indexing may be automatically performed in a manner wherein substantial saving in time and effort is attained thereby. The indexing head and base means described therewith afford an arrangement whereby the set-up for a particular gear cutter may be quickly achieved with a minimum of effort, and whereby the cutting operation can be greatly enhanced with the resulting saving in time, effort, and cost of equipment.

A modified form of the invention is illustrated in FIG. 6. As shown therein, the indexing head 100 comprises a base member 101 upon which the indexing head is suitably supported on the table 102 of a cutting, grinding or drilling machine so that a work piece $W^2$ is supported about a horizontally disposed work holder 103. The base 101 has a horizontally disposed flange 101A by which the base is suitably secured by suitable fasteners 104 to the table 102 of a machine. A vertically disposed flange or upright 101B is connected to the bottom support flange 101A. Suitably secured or attached to the vertical flange 101B is the indexing housing 105 of the indexing head 100. In this form of the invention the operating component disposed within the indexing housing 105 is similar to that described with respect to the indexing head of FIG. 1, except as hereinafter described.

In this form of the invention the projecting end of the spindle 137 is horizontally disposed and is provided with a driving means for engaging a work holder 103. In the illustrated form the drive means comprises a projecting lug 137A of desired polygonical shape, as for example a square lug. Detachably connected to the projecting end or leg 137A of the indexing head spindle 137 is a work holder in the form of an elongated arbor 103. As shown the arbor 103 is provided with an enlarged portion formed with a complementary recess 103B for accommodating the projecting lug 137A of the spindle and thereby connecting the arbor 103 in driving relationship with spindle 137. The enlarged portion of the arbor 103B defines a shoulder stop 105. The arrangement is such that the arbor 103 will rotate in unison with the indexing head spindle 137.

As will be described, this embodiment is particularly adapted for gang cutting and/or shaping a gear on a horizontal cutting or grinding machine. As best seen in FIG. 6, a master gear 107 is suitably supported on the arbor 103 adjacent the stop 105. A plurality of gear blanks $W^2$ to be shaped into gears are stacked on the arbor 103 so as to fit up against the master gear 107. The master gear 107 and blanks $W^2$ are then secured to the arbor by means of a suitable lock nut 108. As shown, the threaded end portion 103A of the arbor 103 extends slightly beyond the end of the lock nut 108 and is provided with a centering counter bore 109 which is adapted to receive a tail stock 110 for rotatably supporting the extended end of the arbor 103. It will be understood that the tail stock 110 is suitably supported on the table 102 of the machine on a support mount 111.

It will be understood that the tail stock 110 is mounted for longitudinal adjustment toward and away from the indexing head on the tail stock assembly. A suitable locking means 112 is provided for securing the tail stock arbor 110 in the adjusted position or fixed position as shown. To machine the blanks $W^2$, the table supporting the indexing head is moved relative to a cutting tool 113, as for example, a cutter or grinder, whereupon the tool 113 will form the necessary cutting operation or work on the successive blanks $W^2$ mounted on the arbor 103. Consequently it will be understood that by effective relative movement between the tool 113 and indexing head, and by effecting sequential indexing of the work pieces upon the completion of each cutting pass, that the work pieces $W^2$ are correspondingly shaped to the master gear.

In all other respects the operating mechanism of the indexing head illustrated in the embodiment of FIG. 6 is identical in operation to the embodiment described with respect to FIG. 1.

While the illustrated indexing heads have been illustrated and described with respect to effecting the cutting or sharpening of a gear cutter and/or in the forming and shaping of gear blanks, it will be understood that indexing heads can be readily adapted to any machining operation, as for example, drilling, milling and the like wherein an indexing of the work piece is required to form the same.

While the instant invention has been described with respect to several embodiments thereof it will be readily understood and appreciated that variations and modifications may be formed without departing from the spirit or scope of the invention.

I claim:

1. An indexing head for use in machining a work piece comprising:
   a base means adapted to be attached to a table of a grinding machine,
   a housing attached to said base means,
   a work holder means rotatably journalled in said housing,
   means adapted for securing the work piece having a plurality of spaced apart gear teeth to said work holder,
   a unidirectional drive means operatively connected to said holder means for indexing of said work holder through predetermined incremented amounts,
   means for limiting the action of said unidirectional drive means to provide for slightly over indexing of said work piece,
   a locating means disposed adjacent said work holder means for engaging said work piece,
   and an actuating means for activating said locating means between operative and inoperative position whereby in the operative position ssid locating means engages the space between adjacent teeth of the work piece to prohibit rotation of said work piece upon the return of said unidirectional drive means and to properly locate the work piece relative to the tool and adapted to operate thereon.

2. The invention as defined in claim 1 wherein said work holder means includes a table means and a connecting spindle,
   said spindle being rotatably journalled to said housing, and
   said unidirectional drive means including:
   a driving gear mounted on said spindle for relative rotation thereto,
   a clutch ring fixedly secured to said driving gear,
   a clutch ratchet disposed within said ring,
   means for fixedly securing said clutch ratchet to said spindle to rotate therewith,
   wedging means disposed between said clutch ratchet and said clutch ring for connecting said clutch ratchet and spindle to said clutch ring when said driving gear is rotated in the indexing direction,
   and means for effecting the drive of said driving gear.

3. The invention as defined in claim 2 wherein said latter means comprises:
   a rack disposed in meshing relationship with said driving gear,
   and a power means for effecting linear displacement of said rack.

4. The invention as defined in claim 3 wherein said power means comprises:
   a piston and cylinder means, said piston being operatively connected to said rack, and
   a means for introducing fluid pressure to actuate said piston.

5. The invention as defined in claim 4 wherein said limiting means comprises an adjusting screw extending through a wall portion of said cylinder to limit the travel of said piston during an indexing operation.

6. The invention as defined in claim 1 wherein said locating means comprises a slide mounted for movement toward and away from said work piece,
   tooth locator connector on the end of said slide,
   said tooth locator including a sector having teeth adapted to complement the teeth of said work piece to maintain said work piece in the indexing position during the work being performed on said work piece,
   and means for activating said locator means to move said sector into meshing relationship to the teeth of the work piece to maintain said work piece in the indexed position.

7. The invention as defined in claim 6 wherein said last mentioned means includes a piston and cylinder assembly, said piston being operatively connected to said slide, and means for introducing fluid pressure into said cylinder to effect displacement of said slide piston.

8. The invention as defined in claim 6 and including means for automatically sequencing the operation of the respective piston to effect sequential indexing and holding of the work piece in the indexed position.

9. The invention as defined in claim 1 wherein said base means comprises:
  a base plate,
  a first sine plate overlying said base plate and pivotally mounted to said base plate about an axis of revolution adjacent one end of said base plate,
  a camming means interposed between said base plate and said first sine plate,
  means for effecting a controlled displacement of said camming means to effect angular displacement of said sine plate relative to said base plate,
  means for locking said first sine plate relative to said base plate in the adjusted position thereof,
  a second sine plate pivotally connected to said first sine plate about an axis of revolution disposed at substantially right angle to said first mentioned axis of revolution,
  a camming means disposed between said first and second sine plate to effect relative angular displacement therebetween about said second axis of rotation,
  means operatively connected to said camming means to control the angular displacement between said sine plates,
  and means for locking said second sine plate relative to said first sine plate in the adjusted position.

10. An indexing head for sharpening gear cutters comprising:
  a base including,
  a base member adapted to be secured to the table of a grinding machine,
  a first sine plate overlying said base member,
  pivot means for pivotally connecting said sine plate relative to said base member about an axis of rotation adjacent one edge of said base member,
  a camming means interposed between said base member and said sine plate,
  said camming means including a cam carrier,
  cam rollers oppositely disposed on said cam carrier,
  complementary cam wedges disposed on said base member and first since plate disposed in rolling engagement with said cam wedges,
  means for effecting a controlled displacement of said cam carrier to effect angular displacement of said sine plate relative to said base member to determine an angular adjustment therebetween,
  means for locking said sine plate in the adjusted positioned thereof,
  a second sine plate,
  means for pivoting said second sine plate relative to said first since plate to define an axis of revolution whereby the axis of revolution of said second sine plate is disposed at right angle to the axis of revolution of said first sine plate,
  second camming means interposed between said first and second sine plates,
  means for effecting control displacement of said second camming means to determine the angular relationship between said first and second sine plates,
  means for locking said second sine plates relative to said first sine plate in the adjusted position thereof,
  a housing connected to said second sine plate,
  a table and connected spindle rotatably journalled on said housing,
  means for locking a workpiece to said table,
  a unidirectional drive means operatively connected to said spindle for indexing said table through predetermined incremented angles,
  said unidirectional drive means including a driving gear mounted on said spindle for relative rotation,
  a clutch ring circumscribing said spindle secured to said gear to rotate therewith,
  a clutch ratchet disposed within said clutch ring,
  means fixedly securing said clutch ratchet to said spindle,
  means disposed between said clutch ratchet and clutch ring to define a unidirectional coupling therebetween whereby rotation of said driving gear in the indexing direction effects the drive of said spindle in the indexing direction only,
  means for effecting the drive of said driving gear,
  means for limiting the drive of said driving gear to provide for slightly over indexing of the workpiece adapted to be secured to said table,
  a locating means disposed adjacent said table means,
  and an actuating means for activating said locating means between
  an operative and inoperative position.

11. The invention as defined in claim 10 wherein said ratchet includes a plurality of circumferentially spaced notches,
  and said coupling means for connecting said ratchet to said clutch ring to effect a unidirectional drive in the direction of index including a clutch pin disposed in each of said notches arranged to be wedged between said ratchet and clutch ring to effect the drive therebetween.

12. The invention as defined in claim 11 and including spring means operating on each of said clutch pins to normally bias the respective pins toward inoperative position.

13. The invention as defined in claim 10 wherein said locating means includes
  a slide mounted for movement toward and away from a work piece,
  a tooth sector mounted on said slide to complement the teeth of said work piece for meshing therewith in the operative position to locate and maintain said workpiece in the indexed position,
  and means for activating said slide between operative and inoperative position.

14. The invention as defined in claim 1 wherein said work holding means includes an extended arbor adapted for supporting a work piece thereon.

15. The invention as defined in claim 14 wherein said base means includes a mounting portion and a supporting flange disposed normal to said mounting portion,
  said housing being mounted to said supporting flange, and said work holding means includes a spindle rotatably journalled to said housing, a drive means connected to the end of said spindle, an arbor adapted to support a work piece connected in driving relationship to said drive means, and a tail stock for rotatably supporting the extended end of said arbor.

* * * * *